United States Patent
Nishigaki et al.

(10) Patent No.: US 6,298,168 B1
(45) Date of Patent: Oct. 2, 2001

(54) IMAGE CODING APPARATUS

(75) Inventors: Junji Nishigaki, Toyokawa; Shoji Imaizumi, Shinshiro; Kenichi Morita, Toyohashi, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/260,089

(22) Filed: Mar. 2, 1999

(30) Foreign Application Priority Data

Mar. 3, 1998 (JP) ................................................... 10-050435
Mar. 3, 1998 (JP) ................................................... 10-050438

(51) Int. Cl.[7] ................................................... G06K 9/36
(52) U.S. Cl. ..................... 382/248; 358/433; 375/240.24
(58) Field of Search ................................... 382/232–233, 382/162, 164, 166, 239, 243, 248, 253, 240; 358/430, 432–433, 539, 428; 375/240.18, 240.2, 240.24, 240.25; 348/607

(56) References Cited

U.S. PATENT DOCUMENTS

| | | | | |
|---|---|---|---|---|
| 4,319,267 | * | 3/1982 | Mitsuya et al. | 358/539 |
| 5,060,285 | * | 10/1991 | Dixit et al. | 382/253 |
| 5,576,845 | * | 11/1996 | Komatsu | 358/433 |
| 5,805,303 | * | 9/1998 | Imaizumi et al. | 358/433 |
| 5,828,467 | * | 10/1998 | Suzuki | 358/428 |
| 5,987,175 | * | 11/1999 | Imaizumi et al. | 382/232 |
| 6,026,194 | * | 2/2000 | Torikai et al. | 382/232 |
| 6,195,128 | * | 2/2001 | Streater | 375/240.24 |

FOREIGN PATENT DOCUMENTS 253745    6/1996   (JP) ................................. H04N/1/47

* cited by examiner

*Primary Examiner*—Leo Boudreau
*Assistant Examiner*—Ishrat Sherali
(74) *Attorney, Agent, or Firm*—Burns, Doane, Swecker & Mathis, LLP

(57) ABSTRACT

In an image coding apparatus for encoding and decoding multi-level image data with block truncation coding, multi-level image data is divided into second blocks (e.g., 6*6 pixels) which is larger in size than a first block (e.g., 4*4 pixels) to be coded. Average value and gradation level amplitude are calculated on a second block, and encoding and decoding are performed on a first block by using the average value and gradation level amplitude. When a pixel not adjacent to the first block is included in an end of the image or the like in a second block, data of the actual pixels are used for the pixels having no data. Thus, deterioration of the image quality can be reduced.

16 Claims, 10 Drawing Sheets

Fig.7B Pixel block

Original picture

|   | 1 | 2 | 3 | 4 | 5 | 6 | 7 | 8 | 9 | 10 | 11 | 12 |
|---|---|---|---|---|---|---|---|---|---|---|---|---|
| 1 | 209 | 211 | 199 | 211 | 201 | 199 | 195 | 191 | 191 | 173 | 149 | 139 |
| 2 | 197 | 201 | 183 | 183 | 167 | 163 | 155 | 139 | 127 | 123 | 107 | 113 |
| 3 | 153 | 147 | 135 | 127 | 119 | 117 | 109 | 105 | 101 | 109 | 111 | 125 |
| 4 | 113 | 109 | 105 | 105 | 105 | 105 | 109 | 113 | 127 | 135 | 159 | 173 |
| 5 | 97 | 101 | 103 | 111 | 117 | 127 | 145 | 157 | 177 | 189 | 191 | 199 |
| 6 | 107 | 115 | 131 | 149 | 165 | 185 | 191 | 197 | 209 | 207 | 205 | 211 |
| 7 | 149 | 163 | 179 | 193 | 197 | 205 | 209 | 211 | 211 | 215 | 215 | 215 |
| 8 | 193 | 195 | 207 | 201 | 207 | 209 | 211 | 215 | 215 | 215 | 217 | 213 |
| 9 | 205 | 211 | 217 | 215 | 213 | 207 | 211 | 219 | 221 | 219 | 221 | 221 |
| 10 | 215 | 211 | 221 | 213 | 215 | 215 | 211 | 217 | 219 | 213 | 223 | 223 |
| 11 | 219 | 215 | 213 | 217 | 213 | 213 | 215 | 217 | 215 | 215 | 225 | 223 |
| 12 | 217 | 215 | 221 | 215 | 219 | 215 | 221 | 219 | 213 | 219 | 223 | 219 |

|    | 1   | 2   | 3   | 4   | 5   | 6   | 7   | 8   | 9   | 10  | 11  | 12  |
|----|-----|-----|-----|-----|-----|-----|-----|-----|-----|-----|-----|-----|
| 1  | 203 | 203 | 203 | 203 | 196 | 196 | 196 | 196 | 178 | 178 | 155 | 133 |
| 2  | 203 | 203 | 203 | 203 | 167 | 167 | 167 | 139 | 110 | 110 | 110 | 110 |
| 3  | 142 | 142 | 142 | 111 | 110 | 110 | 110 | 110 | 110 | 110 | 110 | 110 |
| 4  | 111 | 111 | 111 | 111 | 110 | 110 | 110 | 110 | 110 | 133 | 155 | 178 |
| 5  | 109 | 109 | 109 | 109 | 164 | 164 | 164 | 164 | 194 | 194 | 194 | 194 |
| 6  | 109 | 109 | 109 | 139 | 164 | 180 | 196 | 196 | 207 | 207 | 207 | 214 |
| 7  | 139 | 167 | 197 | 197 | 196 | 212 | 212 | 212 | 214 | 214 | 214 | 214 |
| 8  | 197 | 197 | 197 | 197 | 212 | 212 | 212 | 212 | 214 | 214 | 214 | 214 |
| 9  | 210 | 210 | 216 | 214 | 211 | 207 | 211 | 219 | 222 | 219 | 222 | 222 |
| 10 | 214 | 210 | 220 | 210 | 215 | 215 | 211 | 219 | 219 | 214 | 222 | 222 |
| 11 | 220 | 214 | 210 | 216 | 211 | 211 | 215 | 219 | 214 | 214 | 222 | 222 |
| 12 | 216 | 214 | 220 | 214 | 219 | 215 | 219 | 219 | 214 | 219 | 222 | 219 |

|    | 1   | 2   | 3   | 4   | 5   | 6   | 7   | 8   | 9   | 10  | 11  | 12  |
|----|-----|-----|-----|-----|-----|-----|-----|-----|-----|-----|-----|-----|
| 1  | 207 | 207 | 207 | 207 | 204 | 204 | 204 | 204 | 194 | 167 | 141 | 141 |
| 2  | 207 | 207 | 207 | 207 | 174 | 174 | 144 | 144 | 114 | 114 | 114 | 114 |
| 3  | 142 | 142 | 142 | 109 | 114 | 114 | 114 | 114 | 114 | 114 | 114 | 114 |
| 4  | 109 | 109 | 109 | 109 | 114 | 114 | 114 | 114 | 114 | 141 | 167 | 167 |
| 5  | 107 | 107 | 107 | 107 | 113 | 113 | 145 | 145 | 168 | 190 | 190 | 214 |
| 6  | 107 | 107 | 107 | 139 | 175 | 207 | 207 | 207 | 214 | 214 | 214 | 214 |
| 7  | 139 | 171 | 171 | 203 | 207 | 207 | 207 | 207 | 214 | 214 | 214 | 214 |
| 8  | 203 | 203 | 203 | 203 | 207 | 207 | 207 | 207 | 214 | 214 | 214 | 214 |
| 9  | 204 | 210 | 218 | 218 | 214 | 206 | 210 | 218 | 222 | 218 | 222 | 222 |
| 10 | 218 | 210 | 218 | 218 | 214 | 214 | 210 | 218 | 218 | 212 | 222 | 222 |
| 11 | 218 | 218 | 218 | 218 | 214 | 214 | 214 | 218 | 212 | 212 | 222 | 222 |
| 12 | 218 | 218 | 218 | 218 | 218 | 214 | 218 | 218 | 212 | 218 | 222 | 218 |

IMAGE CODING APPARATUS

This application is based on applications Nos. 10-50453 and 10-50438/1998 filed in Japan, the content of which is incorporated hereinto by reference.

BACKGROUND OF THE INVENTION

1. Field of the Invention

The present invention relates to an image coding apparatus for compressing multi-level image data.

2. Description of Prior Art

A block truncation coding is used in the field of compression of the multi-level image data. In the block truncation coding, an image is divided into a plurality of pixel blocks. For each block, a quantity on an average value of the multi-level image data and a quantity on gradation level distribution thereof are calculated, and a pixel data is quantized in accordance with the quantities to determine code data of a smaller number of gradation levels. Then, the quantities on the average value and the gradation level distribution and the code data of each pixel are used as encoded data of the block.

However, when the pixel data is divided into a plurality of pixel blocks and compressed block by block, a great difference between the decoded image data arises at boundaries between the blocks, or a so-called block noise is produced to deteriorate image quality. It is therefore desirable that the block noise is reduced.

For the block truncation coding on image data comprising a plurality of colors for each color plane, it is proposed to shift coding blocks of the plurality of colors. However, this makes the circuit structure complicated because the adjustment is carried out based on correlation in each color.

SUMMARY OF THE INVENTION

An object of the present invention is to provide an image coding apparatus which reduces block noises at the boundaries between the blocks in the block truncation coding of the multi-level image data, so as to reproduce an image of good quality on decoding.

In one aspect of the present invention, in an image coding apparatus which encodes multi-level image data on image density at pixels, a block extractor extracts a first block and a second block based on image data, the first block comprising a plurality of pixels to be encoded, the second block including the plurality of pixels in the first blocks. A calculator which calculates feature quantities based on image data of all the pixels included in the second block extracted by said block extractor. An encoder which encodes image data of the pixels in the first block according to correlation of the image data in the first block with the feature quantities calculated on the second block by said calculator.

In a different aspect of the invention, the block extractor extracts the first blocks over an entire image area by shifting the first block sequentially in the entire image area. When one of the second blocks includes pixels not existing in the image area, it adds image data derived from image data of pixels existing in the image area to the pixels not existing in the image area.

An advantage of the present invention is that block noises are reduced.

Another advantage of the present invention is that in the block truncation coding, deterioration of the image quality of the decoded image can be reduced at an end of the image.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 7A, 7B, 7C, 7D, 7E, 7F, 7G and 7H are diagrams for illustrating block extraction at an end of image and the result of the block extraction;

DETAILED DESCRIPTION OF THE PREFERRED EMBODIMENTS

Figure 1:
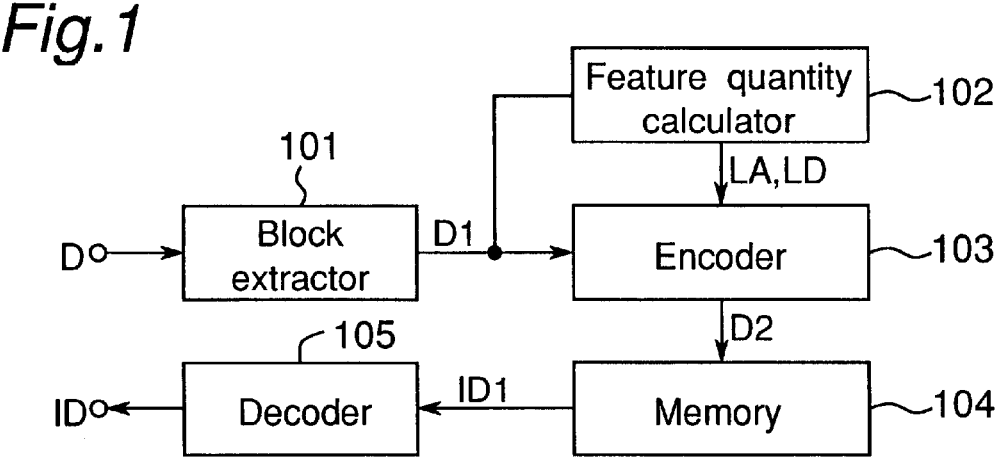
FIG. 1 is a block diagram of an image coding apparatus.

Referring now to the drawings, wherein like reference characters designate like or corresponding parts throughout the several views, embodiments of an image coding apparatus according to the present invention will be described below. The image coding apparatus uses block truncation coding for compressing multi-level image data. In the encoding, the multi-level image data is divided into first blocks of a plurality of pixels. (For example, each block comprises a two-dimensional array of N*N pixels, where N is an natural number.) The multi-level image data is also divided into second blocks of a plurality of pixels, each second block including the pixels in a first block to be encoded. (For example, a second block comprises a two-dimensional array of M*M pixels, where M is an natural number larger than N.) If a second block includes pixels having no multi-level image data to be encoded, data of other pixels having multi-level image data are supplemented to the pixels having no data, and the data is divided into the second blocks including the first blocks to be encoded. Next, a first feature quantity (average value information) indicating an average value and a second feature quantity (gradation level amplitude information) indicating a gradation level distribution are calculated from all the pixel data included in a second block. Previously, the size of the second block has been the same as that of the first block. After the determining the feature quantities of the second block, the pixel data in the first block is encoded by taking pixel distribution around the first block into account in order to reduce a block noise at boundaries between the first blocks. Each pixel data in the first block is quantized into code data having a smaller number of gradation levels than the multi-level image data in accordance with correlation between the first and second feature quantities. As explained above, the first and second feature quantities are calculated not only from the pixel data in the first block to be encoded but also from the pixel data in the second block larger in size than the first block. Then, the pixel data in the first block is quantized in accordance with the resultant first and second feature quantities. The first and second feature quantities and the code data of each pixel are stored as encoded data of the pixels in the first block. On decoding, the multi-level image data of each pixel in the first block is decoded in accordance with the first and second feature quantities and the code data of each pixel obtained above.

In a portion such as an end of an image is processed as described below, when a second block is extracted, one/some of the pixels adjacent to a first block included in the second block does/do not have data of an original image. Then, data are supplemented for the pixels. For example, such a pixel is replaced by virtual data of white data (255 of reflectance), to form the second block and to perform the block truncation coding. However, in this case, a good image may not be obtained on decoding due to a great difference between the virtual data (255) in the second block and the original data of the original image. Then, when the second block includes pixels which do not actually exist, it is preferable that data of actual pixels is allocated to the data of the pixel which does not actually exist. In concrete, the data of a pixel closest to the pixel that does not actually exist is embedded in the data for the pixel which does not actually exist.

Figure 2:
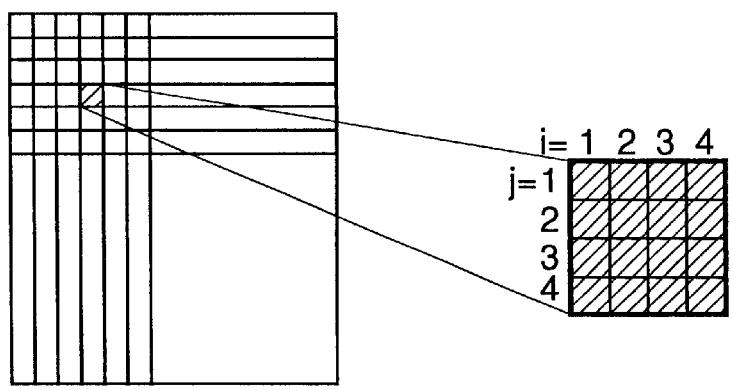
FIG. 2 is a diagram for illustrating division of an image into blocks.
Figure 3:
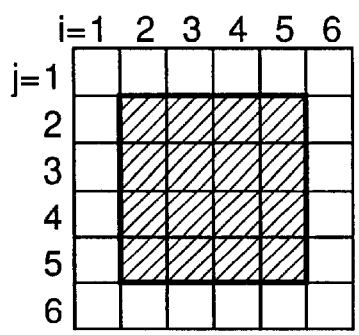
FIG. 3 is a diagram of a block having 6×6 pixels for use in a block truncation coding.

Next, the image coding apparatus will be described in detail. FIG. 1 shows the image coding apparatus generally. In this image coding apparatus, multi-level image data D of 8 bits for each pixel is received from an image scanner and is inputted to a block extractor 101. As shown in FIG. 2, an original image to be encoded (shown in the left side in FIG. 2) is divided into blocks, each having N*N pixels (N=4) as shown at the right side in FIG. 2. The division is performed by the block extractor 101. The block extractor 101 also extracts, from the multi-level image data, the block having M*M pixels (M=6) including the 4*4 pixels and peripheral pixels around the 4*4 pixels. That is, as shown in FIG. 3, the block extractor 101 extracts, from the data D of the original image, the image data comprising the block having 6*6 pixels which includes the block having 4*4 pixels that are subjected to block truncation coding and pixels of peripheral rows and columns adjacent to the block of 4*4 pixels. When a pixel which does not actually exist is included in a second block in a portion such as an end of the image, data of another pixel closest to the pixel that does not actually exist is embedded to the data of the pixel which does not actually exist. Thus, the second block is extracted.

Figure 4:
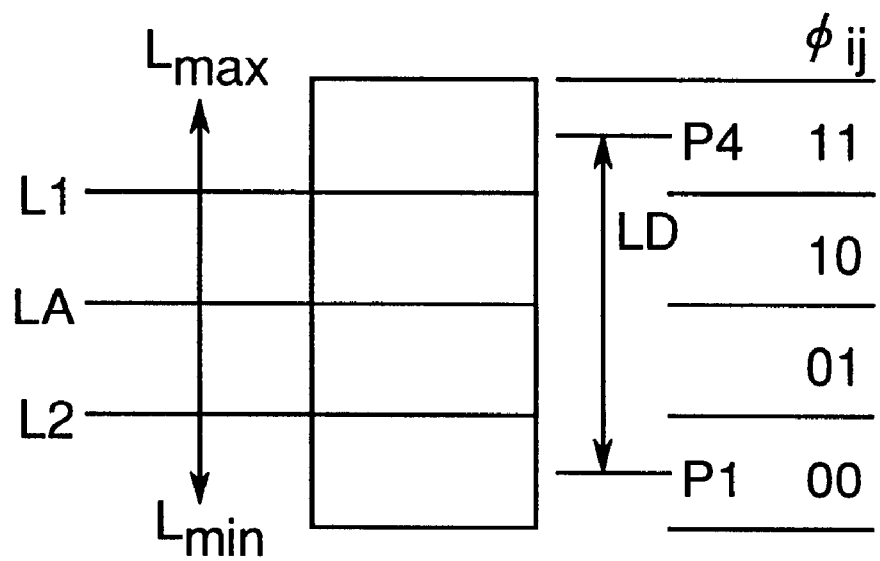
FIG. 4 is a diagram for illustrating block truncation coding.

Block data D1 of 6*6 pixels, which is extracted, is inputted to a feature quantity calculator 102. Predetermined feature quantities required for the coding are then calculated from all image data $X_{ij}$ which are extracted for 6×6 pixels (i, j=1–6). The feature quantities, that is, 8-bit average value information LA and 8-bit gradation level amplitude information LD, are determined by the following operation. FIG. 4 shows a relationship among a maximum value $L_{max}$ and a minimum value $L_{min}$ of the pixel data, parameters P1 and P2 and the gradation level amplitude information LD. First, the maximum value $L_{max}$ and the minimum value $L_{min}$ of the 8-bit image data are detected in the block of 4*4 pixels. Next, the parameters P1 and P2 are determined in accordance with the maximum value $L_{max}$ and the minimum value $L_{min}$ according to Equations (1) and (2).

$$P1=(L_{max}+3L_{min})/4 \quad (1)$$

$$P2=(3L_{max}+L_{min})/4 \quad (2)$$

Next, an average value Q1 is determined as an average of pixel data equal to or smaller than the parameter P1 in the image data of the pixels. Also, an average value Q4 is determined as an average of image data equal to or larger than the parameter P2 in the image data of the pixels. The average value information LA=(Q1+Q4)/2 and the gradation level amplitude information LD=Q4−Q1 are determined in accordance with the obtained average values Q1 and Q4.

An encoder 103 converts each pixel data $X_{ij}$ in the block data D1 into 2-bit code data $\phi_{ij}$ (i, j=1 to 4) in accordance with the informations LA and LD obtained by the calculator 102. The data $X_{ij}$ represents a value for a pixel located in the i-th column and the j-th row in the block of 4*4 pixels. The above-described block data D1 (each pixel has the 8-bit binary data, i.e., 256 gradation levels), and the conversion is performed on 4*4 pixels (a hatching portion in FIG. 3) to be subjected to block truncation coding in the block of 6*6 pixels. First, Equations (3) and (4) are operated to determine reference values L1 and L2 for use in the encoding.

$$L1=LA-LD/4 \quad (3)$$

$$L2=LA+LD/4 \quad (4)$$

The right side of FIG. 4 shows the values of the 2-bit code data $\phi_{ij}$ which is allocated in response to the data value $X_{ij}$. In more detail, the 2-bit code data $\phi_{ij}$ (noted by the binary number) is allocated in response to the value of the pixel data $X_{ij}$ in the following manner.

If $L1 \leq X_{ij}$, $\phi_{ij}=00$.

If $LA \leq X_{ij} > L1$, $\phi_{ij}=01$.

If $L2 \leq X_{ij} > LA$, $\phi_{ij}=10$.

If $X_{ij} > L2$, $\phi_{ij}=11$. (5)

That is, the image data is classified into four data blocks according as relationships between the values L1, LA and L2, and 2-bit codes $\phi_{ij}$ are allocated to each block.

Figure 5:
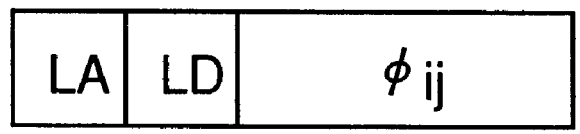
FIG. 5 is a diagram of encoded data obtained by the block truncation coding.

The obtained coded data comprises the code data $\phi_{ij}$ of the 16 pixels of 16*2 bits, the gradation level amplitude information LD and the average value information LA, each information being of 1 byte (8 bits). The above-mentioned operations are performed over an entire area of an original copy, whereby all the image data of the original copy can be compressed. As shown in FIG. 5, by using the above processing, the data of the block having 4*4 pixels (8 bits*16) is converted into LA (8 bits), LD (8 bits) and $\phi_{ij}$ (32 bits=2 bits*16). The code data, which is compressed to ⅜ in an amount of data compared to the original image, is then stored in a memory device 104.

On decoding, a decoder 105 reads out code data ID1 (LA, LD and $\phi_{ij}$) for a block to be decoded from the memory device 104. Then, the decoder 105 converts the data into 8-bit data ID for each pixel. Finally, the decoder 105 outputs the data to a printer or the like. The gradation level amplitude information LD and the average value information LA are used for decoding the data which is encoded by the block truncation coding. In concrete, the image data $X_{ij}$ is replaced by 256 gradation level data $Y_{ij}$ having four values as described below in response to the values of the gradation level amplitude information LD and the average value information LA and the value of the code data $\phi_{ij}$ allocated to the data $X_{ij}$ for a pixel located in the i-th column and the j-th row.

If $\phi_{ij}$=00, $Y_{ij}$=LA−LD/2.

If $\phi_{ij}$=01, $Y_{ij}$=LA−LD/6.

If $\phi_{ij}$=10, $Y_{ij}$=LA+LD/6.

If $\phi_{ij}$=11, $Y_{ij}$=LA+LD/2. (6)

After encoded and decoded as described above, the image data is classified into the four types of the image data $Y_{ij}$ in each block. Therefore, the image has an error of the data clearly relative to the original image. However, the error is very unnoticeable in view of the human visual characteristics, and deterioration of the image quality is little noticeable in the case of compression of a natural image. On the other hand, the parameters Q1 and Q4 are completely restored from the gradation level amplitude LD and the average value LA included in the encoded data. Thus, a bi-level image such as a dither pattern having a black portion equal to or smaller than the parameter P1 and a white portion equal to or larger than the parameter P2 can be more perfectly reproduced than the encoded data. Moreover, the compressed image data can be easily edited because the compressed image retains area information. Furthermore, the compressed image data is decoded by the operation reverse to the encoding, thereby reproducing the image which resembles to the original image and is relatively slightly deteriorated.

A characteristic of the encoding of this embodiment is as follows. Since the encoding is performed by the use of the second block including the data of the pixels in the first block to be encoded and the peripheral image data adjacent to the first block, the image data of the pixels in the first block can be decoded while holding the correlation with the adjacent blocks. Thus, block noise can be reduced at boundaries between the blocks, and consequently a good decoded image can be provided. Another characteristic of the encoding is that deterioration of the decoded image can be reduced even in portions such as an end of the image.

The block extractor 101, the feature quantity calculator 102, the encoder 103 and the decoder 105 can be implemented by a software following a flow described below. However, a hardware circuit may be adopted for the elements.

Figure 6:
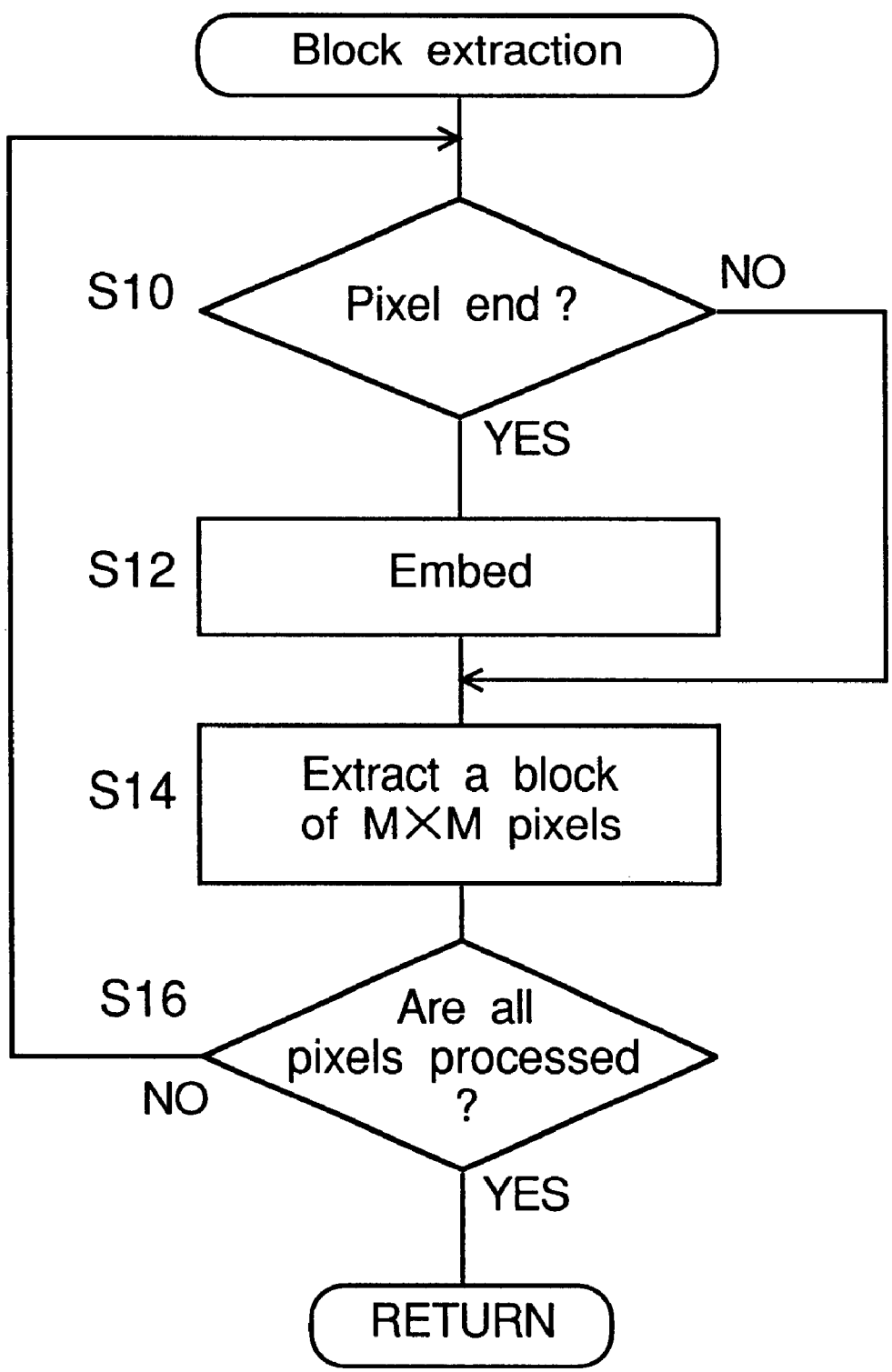
FIG. 6 is a flowchart of block extraction.

FIG. 6 shows a flow of the block extraction. A block, which comprises M*M pixels (M=6) including N*N pixels (N=4) to be subjected to block truncation coding and peripheral pixels adjacent to the 4*4 pixels, is extracted by following steps described below. First, it is decided whether or not the pixel block having N*N pixels is located at an end of the original image (step S10; the term "step" is omitted hereinafter). If the pixel block of 4*4 pixels is located at an end of the image, data of actual pixels are embedded for the peripheral pixels adjacent to the 4*4 pixels in 6*6 pixels which do not have originally data of the original image (S12). Thus, the block is formed. Then, the block having 6*6 pixels is extracted (S14). The processing of steps S10 through S14 is repeated until all the pixels are processed (YES in S16). The above-mentioned embedding is performed for pixels which do not have data of the original image in the block of 6*6 pixels, for example, at an end of the image. This prevents deterioration of the decoded image at an end of the image.

Figures 7A, 7C, 7D, 7E, 7F, 7G, 7H:
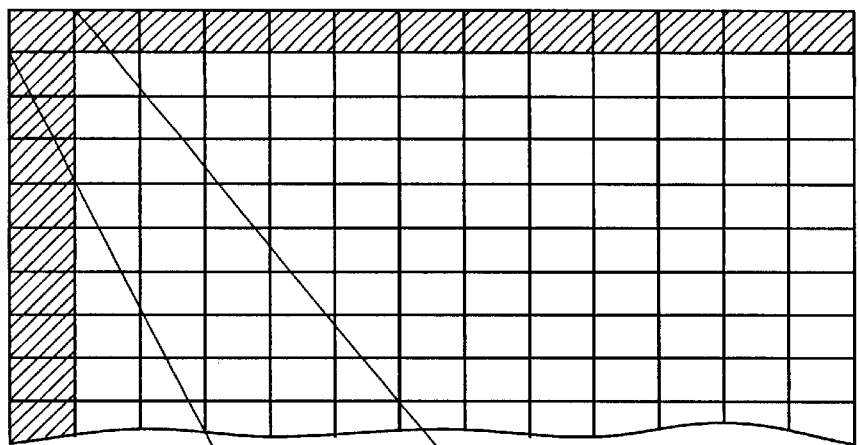

A particular example will be described. An original image shown in FIG. 7A is divided into first blocks, each having 4*4 pixels. In FIG. 7A, the hatching portions represent the first blocks located at an end of the image. These blocks include pixels which do not actually exist when second blocks adjoining these blocks and having 6×6 pixels are extracted. If a first block is located at an end of the image, data of an actual pixel (e.g., the closest pixel) is used for the pixel which does not originally have the data of the original image in the 6*6 pixels including the first block. For example, FIG. 7B shows the 8-bit pixel data of a block located at the uppermost right end of the original image. The data of the closest pixels in a row having pixels (225, 225, 225, 221, 217 and 224 in the first row) are used for a row (zeroth row) having no pixel, and the data of the closest pixels in the row having the pixels (225, 225, 213, 225, 221 and 222 in the first column) are embedded in a column (zeroth column) having no pixel (see FIG. 7C). The data of the pixels which do not actually exist are embedded in this manner so as to extract the blocks having 6×6 pixels. For comparison, FIG. 7D shows an example of the block having the virtual data (e.g., the white data (255)) embedded in the pixels that do not actually exist. FIGS. 7E and 7F show the encoded data corresponding to the second block shown in FIGS. 7C and 7D, respectively. FIGS. 7G and 7H show the decoded data expanded from the encoded data. By comparing the decoded data shown in FIGS. 7G and 7H, it is observed that deterioration of the decoded image can be prevented at an end of the image by embedding the data of the actual pixels.

Figure 8:
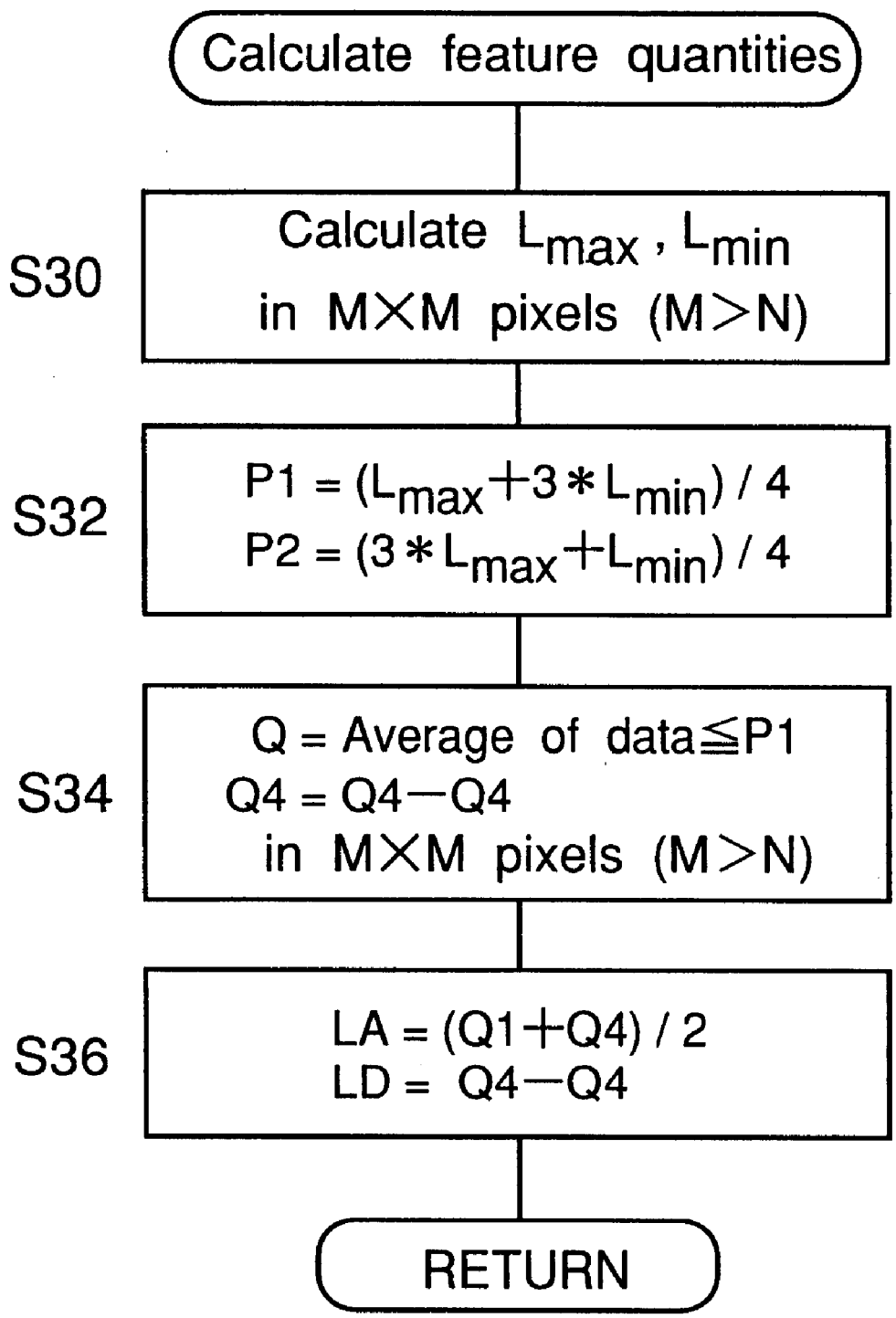
FIG. 8 is a flowchart of calculation of feature quantities.

FIG. 8 shows a flow of the calculation of the feature quantities (the average value information LA and the gradation level amplitude information LD). First, the maximum value $L_{max}$ and the minimum value $L_{min}$ are calculated from the image data in a block comprising M*M pixels (M is an integer that satisfies M>N; M=6 in this embodiment) (step S30). The block includes N*N pixels (N is an integer; N=4 in this embodiment) to be subjected to block truncation coding and peripheral pixels adjacent to the block having 4*4 pixels. Next, the parameters P1 and P2 are calculated from the maximum value $L_{max}$ and the minimum value $L_{min}$ (S32). Next, the average value Q1 of the image data equal to or smaller than P1 and the average value Q4 of the image data equal to or larger than P2 are calculated on the image data of M*N pixels (S34). Next, the average value information LA and the gradation level amplitude information LD are calculated from the average values Q1 and Q4 (S36).

The encoding is performed not only on the image data of the pixels in the first block obtained by dividing the image into blocks, but also on both of the image data of the pixels in the first block and image data of peripheral pixels adjacent to the first block. Thus, the image data of the pixels in the first block can be decoded while holding correlation with the adjacent block. It is thus possible to reduce block noises which are liable to occur at boundaries between the blocks. Therefore, a good decoded image can be provided.

Figure 9:
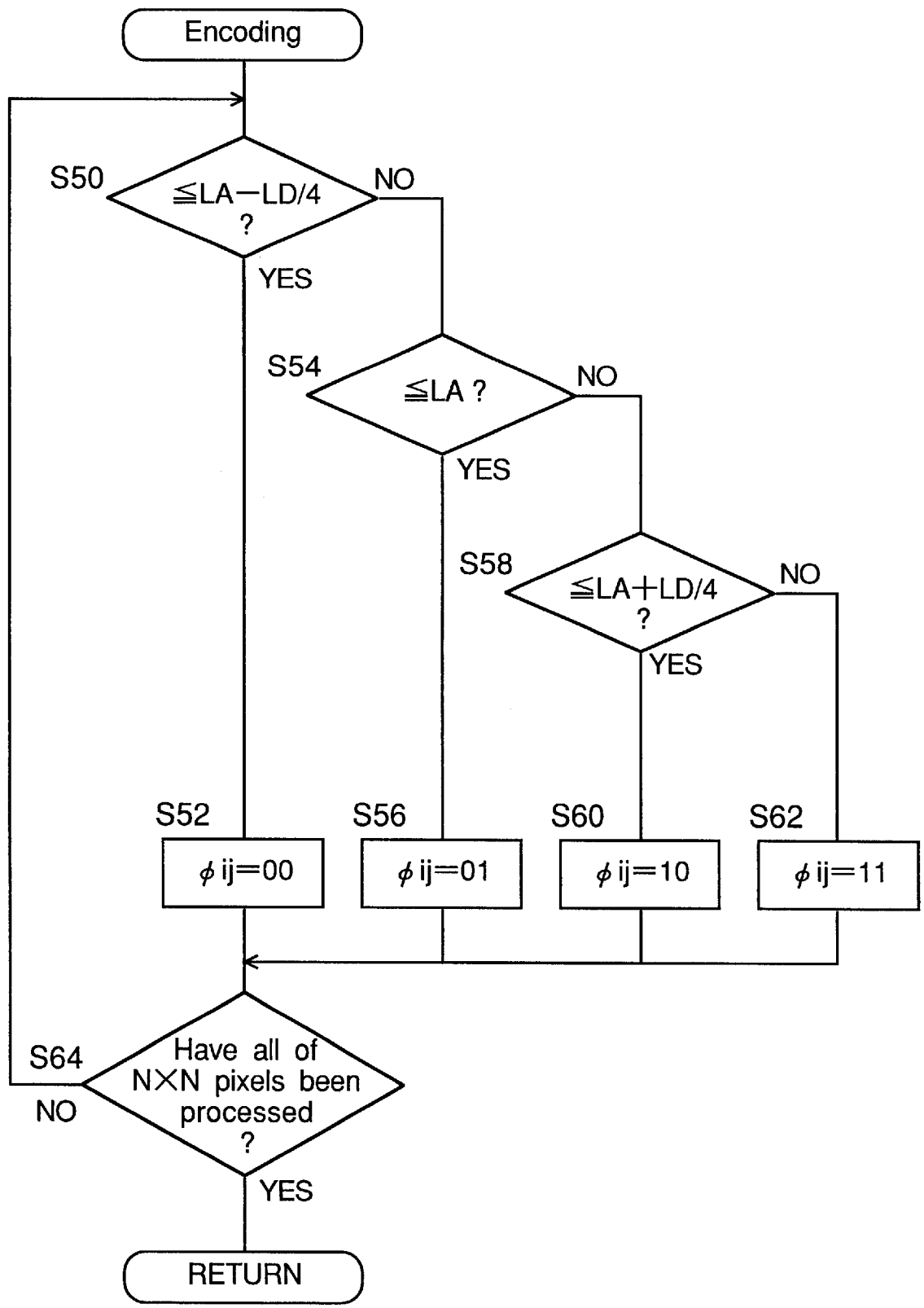
FIG. 9 is a flowchart of encoding.

FIG. 9 shows a flow of the encoding of block truncation coding for a block. The 2-bit values $\phi_{ij}$ (i, j=1 to 4) are calculated for the pixels by following the steps described below. If a pixel data in N*N pixels subjected to block truncation coding is equal to or smaller than LA−LD/4 (S50), the binary number 00 is allocated to $\phi_{ij}$ of the pixel (S52). If the pixel data is larger than LA−LD/4 and is equal to or smaller than LA (S54), the binary number 01 is allocated to $\phi_{ij}$ of the pixel (S56). If the pixel data is larger than LA and equal to or smaller than LA+LD/4 (S58), the binary number 10 is allocated to $\phi_{ij}$ of the pixel (S60). If the pixel data is larger than LA+LD/4, the binary number 11 is allocated to $\phi_{ij}$ of the pixel (S62). The processing of the steps S50 through S62 is repeated until the processing is completed on all the N*N pixels in the block (S64).

Figure 10:
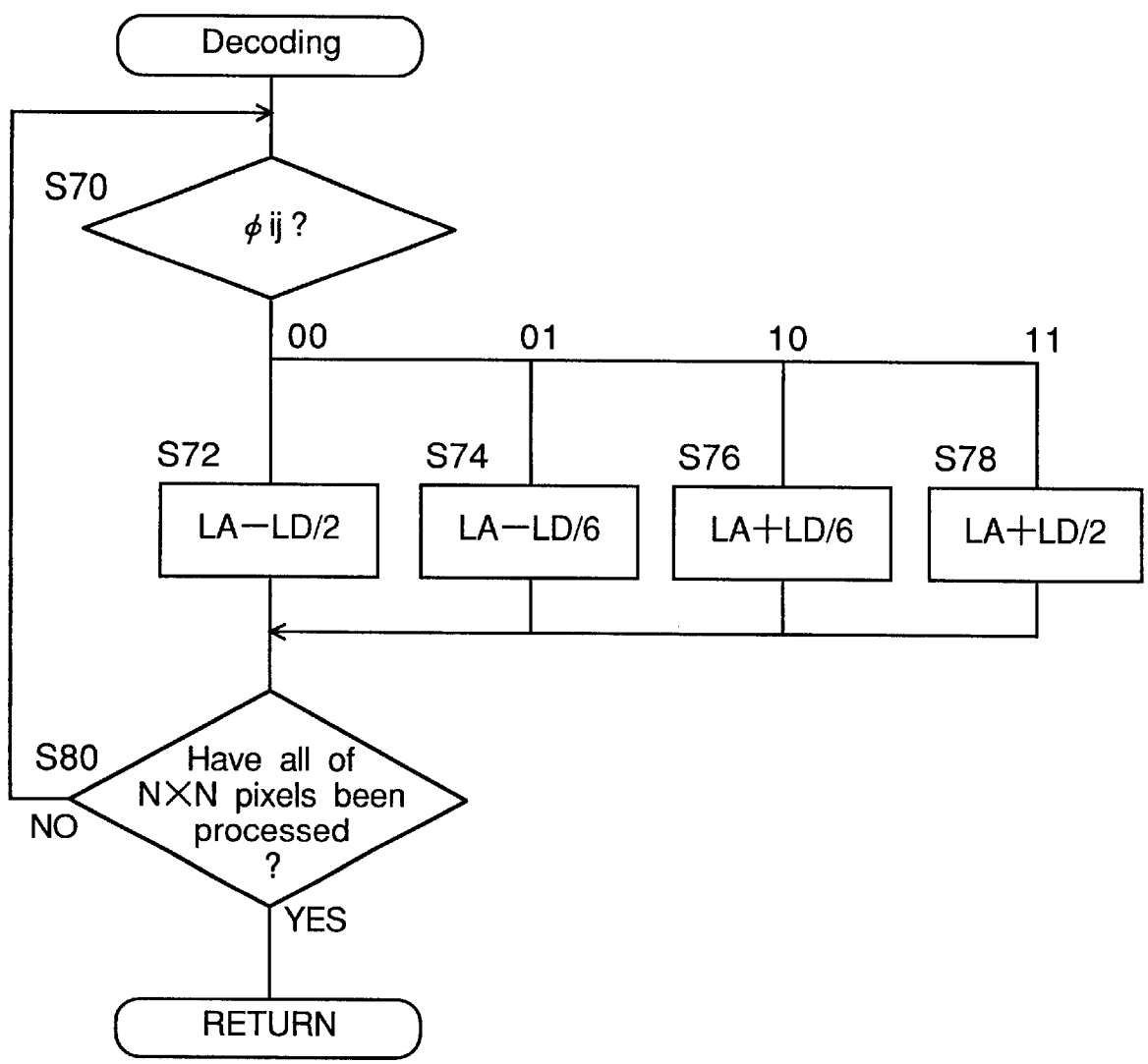
FIG. 10 is a flowchart of decoding.

FIG. 10 shows a flow of the decoding in the block truncation coding for a block. The data of the decoded image of each pixel is calculated from the encoded data LA and LD of each pixel and $\phi_{ij}$ (i, j=1 to 4) by following the steps described below. First, the flow branches according as $\phi_{ij}$ (2 bits) corresponding to a pixel in the N*N pixels to be decoded is the binary number 00, 01, 10 or 11 (S70). If $\phi_{ij}$ is the binary number 00, the 8-bit image data of the corresponding pixel is set to LA−LD/2 (S72). If $\phi_{ij}$ is the binary number 01, the 8-bit image data of the corresponding pixel is set to LA−LD/6 (S74). If $\phi_{ij}$ is the binary number 10, the 8-bit image data of the corresponding pixel is set to LA+LD/6 (S76). If $\phi_{ij}$ is the binary number 11, the 8-bit image data of the corresponding pixel is set to LA+LD/2 (S78). The processing of the steps S70 through S78 is repeated until all the N×N pixels are processed (S80).

Figures 11, 12:
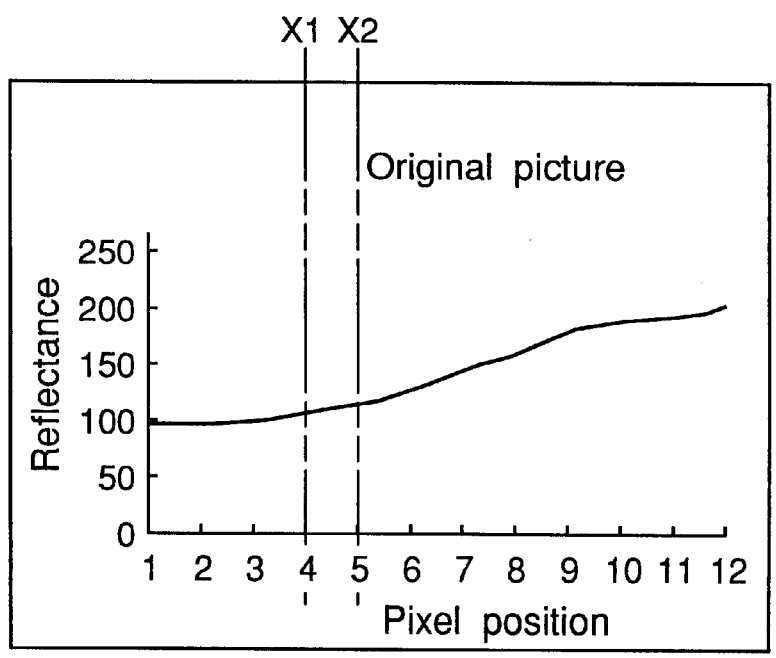
FIG. 11 is a diagram on data having 12×12 pixels in an example of an original image.
FIG. 12 is a graph of one-dimensional data in a fifth row of the data shown in FIG. 11.

Next, an example of block truncation coding will be described. FIG. 11 shows data of 12*12 pixels of an example of original image. FIG. 12 shows one-dimensional data in the fifth row thereof. An ordinate represents image data expressed as reflectance data 0 through 255. An abscissa represents pixel position 1 through 12. This original image is encoded and decoded block by block, each block having 4*4 pixels.

Figures 13, 14:
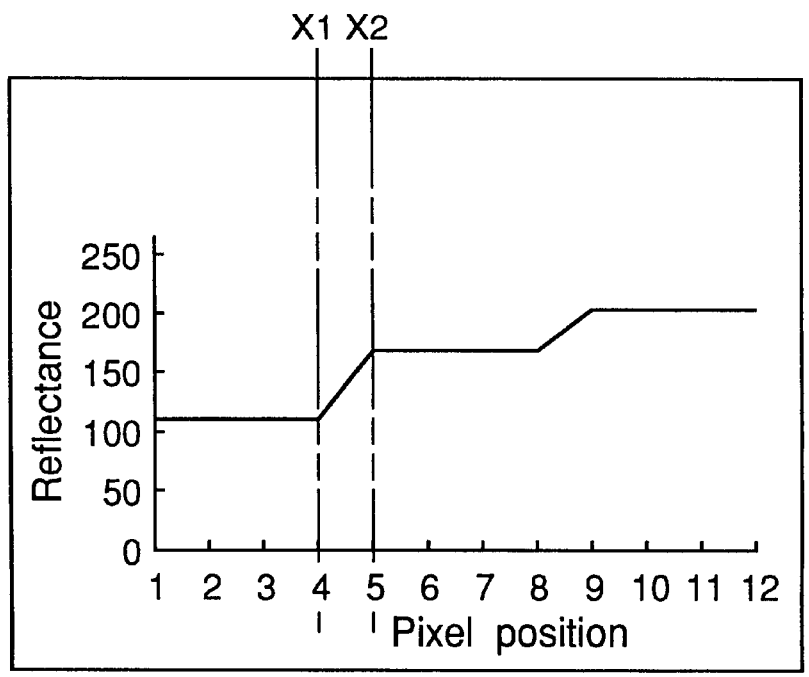
FIG. 13 is a diagram of image data which is obtained by compressing and expanding the original image of FIG. 11 by means of the conventional block truncation coding (N=4)
FIG. 14 is a graph of the one-dimensional data in the fifth row of the data shown in FIG. 13.

FIG. 13 shows image data obtained by compressing and expanding the original image shown in FIG. 11 by means of conventional block truncation coding (N=4). In the conventional block truncation coding, the average value LA and the gradation level amplitude LD for use in quantization are obtained from the data on a block having N*N pixels to be encoded. FIG. 14 shows one-dimensional decoded data in the fifth row. A difference between the decoded image data becomes large at a boundary (X1 and X2 in FIG. 14) between the blocks. Thus, a block noise is observed.

Figures 15, 16:
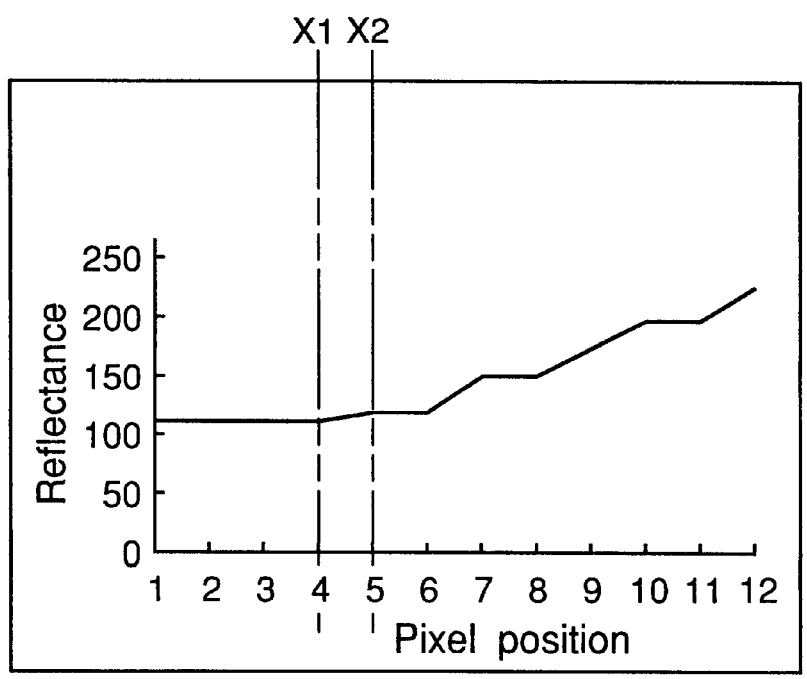
FIG. 15 is a diagram of image data obtained by compressing and decoding the original image of FIG. 11 by means of the block truncation coding (N=4) of an embodiment of the present invention.
FIG. 16 is a graph of the one-dimensional data in the fifth row of the data shown in FIG. 15.

FIG. 15 shows image data obtained by compressing and decoding the original image shown in FIG. 11 by means of the block truncation coding (N=4, M=6) of this embodiment. The image data is encoded and decoded in an enlarged block having 6*6 pixels (e.g., a portion surrounded by a solid line in FIG. 11), by taking peripheral pixels into account. FIG. 16 shows one-dimensional decoded data in the fifth row. There is a little difference between the decoded image data at the boundary (X1 and X2 in FIG. 16) between the blocks. The block noise is thus reduced. Consequently, the decoded image data resembles to the original image data shown in FIG. 12. In this manner, a good image can be decoded.

As described above, the coding is performed by using not only the image data of the pixels in the first block to be encoded, but also the data of peripheral pixels adjoining the first block. Thus, the image data of the pixels in the first block can be decoded while holding the correlation with the adjacent block. It is thus possible to reduce block noises observed previously at boundaries between the blocks. Consequently, a good decoded image can be provided.

When the pixels of a second block including a first block do not exist in a portion such as an end of the image, the data of the actual pixels are used to extract the second block. Thus, deterioration of the image quality of the decoded image can be reduced even at an end of the image.

When the image data having a plurality of colors is encoded, the structure of the apparatus can be simplified because the colors can be processed as separate planes.

It is proposed that color image data is subjected to block truncation coding by shifting the block location in accordance with each color data (Japanese Patent Application laid-open Publication No. 1-181283/1989). The position of the boundary between the blocks is shifted in order to prevent overlapping of block noises of the colors. In this embodiment, the circuit structure is simple because the colors can be processed as the separate planes for the image data for a plurality of colors. In the above-described prior art, the image periphery cannot be blocked, and it is suggested to form a block in such a portion by using the pixel data of pixels adjacent and closest to the pixel. However, the prior art does not disclose that the data of a block larger than the block to be encoded is extracted and the feature quantities for the encoding are determined on the larger block.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image coding apparatus which encodes multi-level image data on image density at pixels, the apparatus comprising:
   a block extractor which extracts a first block and a second block based on image data, the first block comprising a plurality of pixels to be encoded, the second block including the plurality of pixels in the first block;
   a calculator which calculates feature quantities based on image data of all the pixels included in the second block extracted by said block extractor; and
   an encoder which encodes image data of the pixels in the first block according to correlation of the image data in the first block with the feature quantities calculated on the second block by said calculator.

2. The image coding apparatus according to claim 1, further comprising:
   a memory device which stores the data encoded by said encoder; and
   a decoder which decodes the data read from said memory device.

3. The image coding apparatus according to claim 1, wherein the first block consists of pixels of a two-dimensional array of N*N where N is a natural number and the second block consists of pixels of a two-dimensional array of M*M where M is a natural number larger than N.

4. The image coding apparatus according to claim 1, wherein the feature quantities include an average value of image data of all the pixels included in the second block and a quantity on gradation distribution of the image data.

5. An image coding apparatus which encodes multi-level image data on image density at pixels, the apparatus comprising:
   a block extractor which extracts first blocks and second blocks based on image data, each of the first blocks comprising a plurality of pixels to be encoded, each of the second blocks including the plurality of pixels in one of the first blocks;
   a calculator which calculates feature quantities based on image data of all the pixels included in each of the second blocks extracted by said block extractor; and an encoder which encodes image data of the pixels in one of the first blocks according to correlation of the image data with the feature quantities of one of the second blocks including said one of the first blocks calculated by said calculator;

wherein said block extractor extracts the first blocks over an entire image area by shifting the first block sequentially in the entire image area and when one of the second blocks includes pixels not existing in the image area, it adds image data derived from image data of pixels existing in the image area to the pixels not existing in the image area.

6. The image coding apparatus according to claim 5, further comprising:

a memory device which stores data encoded by said encoder; and a decoder which decodes the data read from said memory device.

7. The image coding apparatus according to claim 5, wherein each of the first blocks consists of pixels of a two-dimensional array of N*N where N is a natural number and each of the second blocks consists of pixels of a two-dimensional array of M*M where M is a natural number larger than N.

8. The image coding apparatus according to claim 5, wherein the feature quantities include an average value of image data of all the pixels included in one of the second blocks and a quantity on gradation distribution of the image data.

9. An image coding method for encoding multi-level image data which expresses image density at a pixel, the method comprising the steps of:

extracting a first block and a second block in image data, the first block comprising a plurality of pixels to be encoded, the second block including the plurality of pixels in the first block;

calculating feature quantities based on image data of all the pixels included in the second block; and encoding image data of the pixels in the first block according to correlation of the image data in the first block with the feature quantities calculated on the second block;

wherein said extracting, calculating and encoding steps are repeated over an entire image area.

10. The image coding method according to claim 9, further comprising the steps of:

storing data encoded in said encoding step in a memory device; and decoding data read from the memory device.

11. The image coding method according to claim 9, wherein the first block consists of pixels of a two-dimensional array of N*N where N is a natural number and the second block consists of pixels of a two-dimensional array of M*M where M is a natural number larger than N.

12. The image coding apparatus according to claim 9, wherein the feature quantities include an average value of image data of all the pixels included in the second block and a quantity on gradation distribution of the image data.

13. The image coding method according to claim 9, wherein when the second block is located at an end of the image area, if the second block includes pixels not existing in the image area, image data derived from image data of pixels existing in the image area are added to the pixels not existing in the image area.

14. The image coding method according to claim 13, further comprising the steps of:

storing data encoded in said encoding step in a memory device; and decoding the data read from the memory device.

15. The image coding method according to claim 13, wherein the first block consists of pixels of a two-dimensional array of N*N where N is a natural number and the second block consists of pixels of a two-dimensional array of M*M where M is a natural number larger than N.

16. The image coding method according to claim 13, wherein the feature quantities include an average value of image data of all the pixels included in the second block and a quantity on gradation distribution of the image data.

\* \* \* \* \*